SEED PLANTER

Original Filed Jan. 20, 1968 3 Sheets-Sheet 1

INVENTOR
EUGENE G. KEETON

BY
Cushman, Darby & Cushman
ATTORNEYS

INVENTOR
EUGENE G. KEETON

BY
Cushman, Darby & Cushman
ATTORNEYS

United States Patent Office

Re. 27,578
Reissued Feb. 6, 1973

27,578
SEED PLANTER

Eugene G. Keeton, Rte. 2, Trenton, Ky. 42286

Original No. 3,308,774, dated Mar. 14, 1967, Ser. No. 550,569, May 16, 1966, which is a continuation of Ser. No. 338,927, Jan. 20, 1964. Application for reissue Jan. 29, 1968, Ser. No. 702,143
Int. Cl. A01c *9/00*
U.S. Cl. 221—219 59 Claims

Matter enclosed in heavy brackets [ ] appears in the original patent but forms no part of this reissue specification; matter printed in italics indicates the additions made by reissue.

*ABSTRACT OF THE DISCLOSURE*

*A seed planter having a seed selector which passes through a supply of seeds, engages a seed and slides it along a surface, and discharges the seed through an aperture in the surface. The surface is provided with a step which causes extra seeds engaged by the selector to drop back to the seed supply prior to discharge. A seed conveyor having removable compartment dividers can be used in conjunction with the seed selector.*

*CROSS-REFERENCE TO RELATED PATENTS*

This application is a *reissue of U.S. Letters Patent No. 3,308,774, filed May 16, 1966, which is in turn a* continuation of my parent application Ser. No. 338,927, filed Jan. 20, 1964, and now abandoned.

This invention relates to a new and improved seed planter of the type intended to be attached to the usual tractor or other draft vehicle and which will deposit seeds into a furrow formed in the ground.

The preparation of a field for planting requires a large amount of hard work and expense, the latter being incurred by the cost of fertilizer, seed, equipment and expenditure of time. Therefore, it is necessary that the actual planting of the seed be carried out such that the farmer can rest assured that he has an even planting. If the seed planter should skip and leave areas not planted, then a great deal of work and money have been wasted and unfortunately this is not known until the plants break ground, at which time it may be too late to replant. On the other hand, should the seed planter drop too many seeds, a large amount of additional work and expense is involved to thin out the plants to the desired number.

Seed planters of many various types and designs are now presently on the market but none of the known machines can perform to deposit a given number of seeds in hills or spacings along a furrow without some skipping or depositing extra seeds. Therefore, it is a principal object of the present invention to provide a seed planter which will overcome the weaknesses of the present planters.

Another object of the present invention is to provide a seed planter which will deposit a given number of seeds into the ground at a given distance apart and wherein the number of seeds deposited can be controlled at the will of the operator.

Still another object of the invention is to provide a seed planter which will eliminate skipping during the deposition of the seeds so that the farmer or operator of the planter does not have to worry as to whether or not the area which he has covered is correctly planted.

Still another object of the invention is to provide a seed planter comprising a hopper and rotating disc type seed distributor which comprises a single compact unit.

A further object of the invention is to provide a seed planter of few moving parts so there is very little possibility of mechanical failures.

A further object of the invention is to provide a seed planter which may be used to plant seeds of various sizes without the necessity of a large amount of auxiliary equipment.

Still a further object of the invention is to provide a seed planter wherein the rotary disc type distributor section is easily removable from the frame so the discs can be changed if necessary.

These and other objects of the present invention are set forth in greater detail in the following description having reference to the attached drawings wherein an illustrative embodiment of the invention is shown.

FIGURE 4 is a view along line 4—4 of FIGURE 2;

FIGURE 10 is a fragmentary view of the inner portion of one of the movable fingers.

In the following description right-hand and left-hand reference is determined by standing to the rear of the planter and facing the direction of travel.

Now, having more particular reference to the drawings, an illustrative embodiment of the new and improved seed planter of the invention is generally indicated at 10 and includes a frame 11 and a seed distributor 12.

Figures 1, 5, 6, 7:
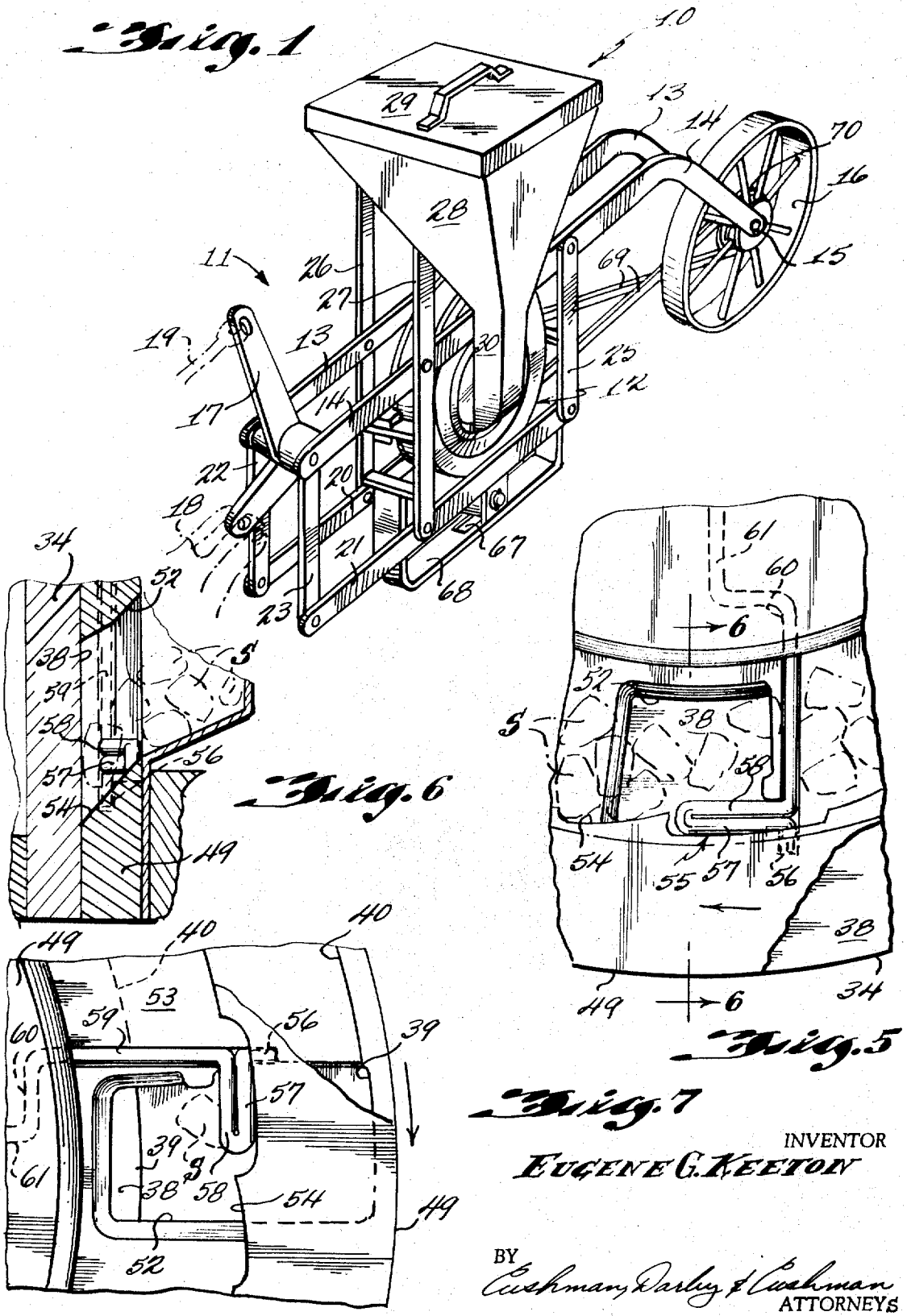
FIGURE 1 is a perspective view of the seed planter of this invention.
FIGURE 5 is a fragmentary view partially broken away of a seed pocket and a gripping finger.
FIGURE 6 is a view taken along line 5—5 in FIGURE 5.
FIGURE 7 is a fragmentary view partially broken away showing a seed pocket in position over the discharge opening.
Figure 2:
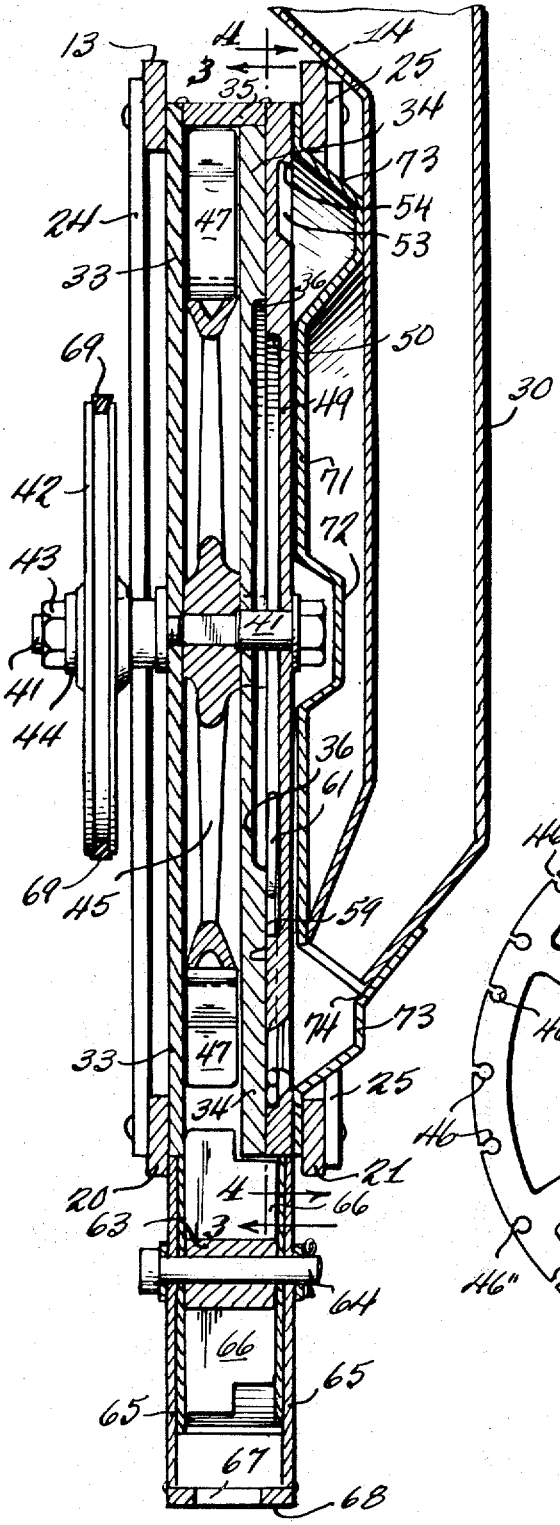
FIGURE 2 is a side elevation section view through the seed planting mechanism only of the planter shown in FIGURE 1.
Figure 9:
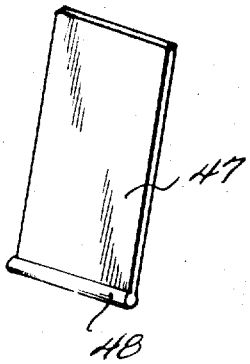
FIGURE 9 is a view of one of the dividers for the wheel shown in FIGURE 8.
Figure 8:
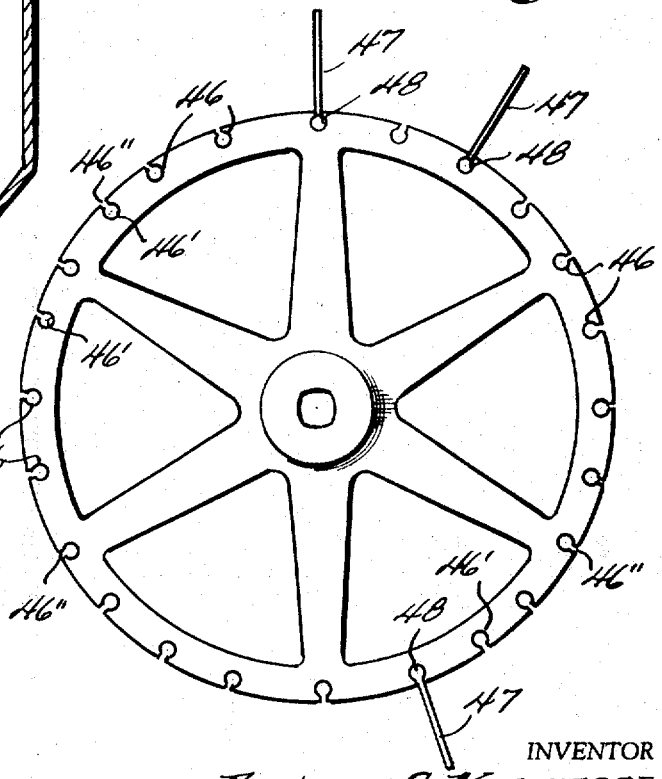
FIGURE 8 is a view of the compartmented wheel.
Figure 1:
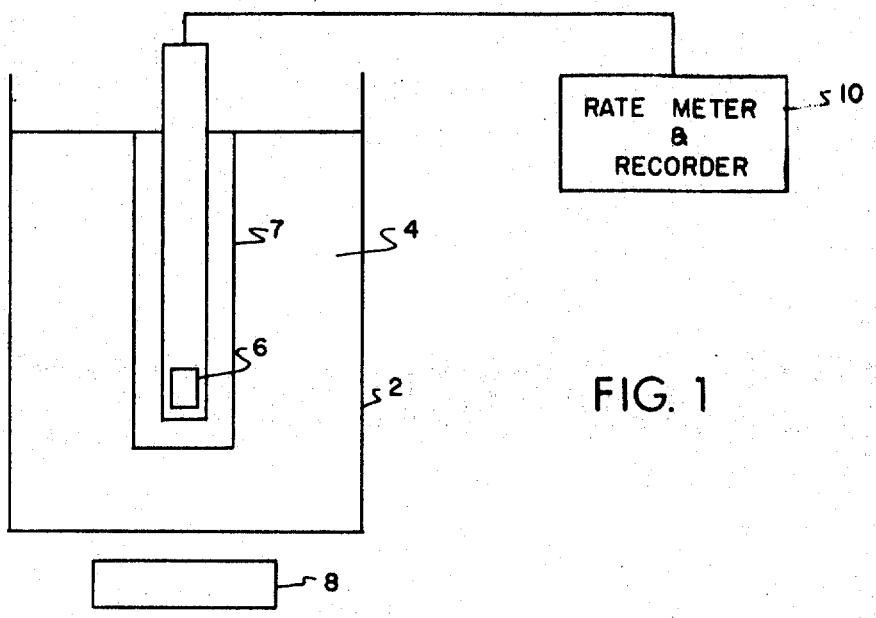
Figure 2:
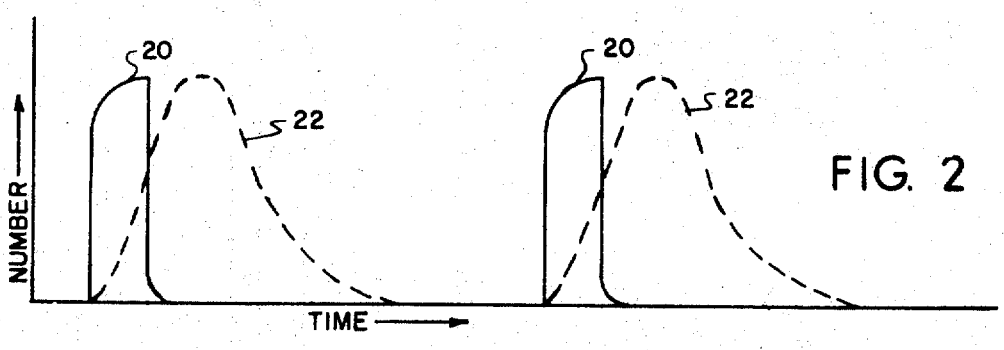

As best shown in FIGURE 1, the frame 11 includes upper structural members 13 and 14 which extend rearwardly then downwardly in parallel relationship. A ground engaging wheel 16 is rotatably mounted between the ends of the downward extending portion of the members 13 and 14 on an axle 15 supported by these members.

Mounted between the forward ends of members 13 and 14 there is the usual hitching member 17 for connecting the planter 10 to a suitable tractor or draft vehicle. Other connections to the tractor are indicated at 18 and 19 but as these connections form no part of the present invention, no further description is believed necessary. Located directly below the members 13 and 14 are lower parallel frame members 20 and 21. Member 20 lies in the same vertical plane and extends in the same direction as does member 13 and member 21 lies in the same vertical plane and extends in the same direction as member 14.

Figure 3:
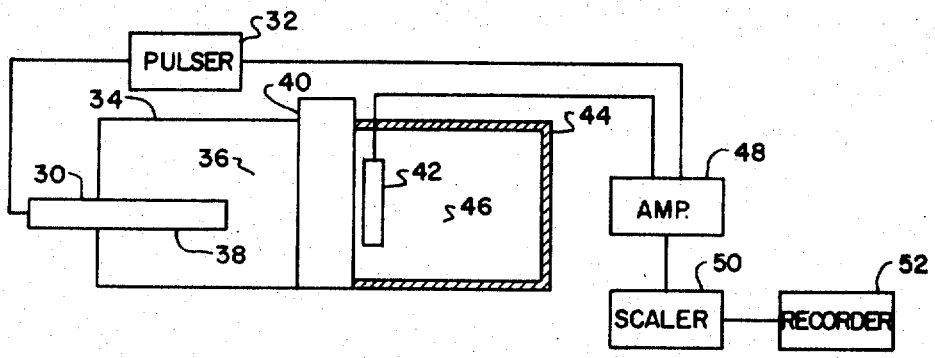
FIGURE 3 is a view along line 3—3 of FIGURE 2.

Both members 20 and 21 are somewhat shorter in length than members 13 and 14 and the front ends of members 20 and 21 are connected respectively to members 13 and 14 by vertical frame elements 22 and 23. The rear ends of members 20 and 21 are connected to members 13 and 14 in a like manner by vertical frame elements 24 (FIG. 3) and 25.

Located between elements 22 and 24 is a hopper support member 26 which is securely fastened to the upper and lower frame members 13 and 20. In a like manner, a second hopper support member 27 is located opposite support 26 and is fastened to upper and lower members 14 and 21. Both support members extend upwardly a for a portion at the bottom thereof when the seed distributor 12 is mounted within the frame 11. The portion which is not enclosed forms an opening 62 through which seed delivered by opening 39 to the interior of the distributor 12 may be dispensed to the ground. A second compartmented wheel 63 is secured to a shaft 64 rotatably supported in a pair of plates 65 such that the upper edge of the dividers 66 of the wheel 63 will pass into the opening 62 and extend thereabove. The wheel 63 acts as a valve gate to receive seeds from the first compartmented wheel 45 and delivers them to the ground through an opening 67 provided within a runner 68 extending below the frame 11 and secured thereto by any suitable means.

A belt 69 connects the pulley 42 to a pulley 70 secured to the ground wheel 15 so that the wheel 45 and disc 49 are rotated as the planter is drawn over the ground and rotation of the wheel 45 causes rotation of wheel 63. This is accomplished by each divider 47 as it passes opening 62, contacting one of the dividers 66 of wheel 63 extending above the opening to rotate the wheel 63 and discharge the seeds therefrom.

A sheet metal cover 71 is provided for the outer face of disc 49 and is held in place by suitable fastening means to frame 11. The cover 71 is formed with a centrally located outwardly bent portion 72 forming a boss which covers the ends of shaft 41 and is further provided with an annular outwardly bent portion 73 located adjacent the periphery of cover 71. The annular portion 73 lies directly over the recess 53 in disc 49 when the cover is secured in place and forms therewith a hollow area to receive seed from the seed boot 30. The seed is fed by gravity from the hopper 28 through boot 30 which is secured in an opening 74 at the bottom of the annular portion 73. The seed will feed into said area formed by the portion 73 and recess 53 until it reaches the level of opening 74 at which time no further seed will enter into the space between these members.

When a field is to be planted with a given crop, the farmer will choose a disc 49 having a given number of openings therein, the number of openings being selected in accordance with the gearing ratio available from pulleys 42 and 70 and the speed of the tractor. All these factors will be computed in advance and be furnished to the user of the planter. It will be understood that a single disc 49 with a given number of openings will perform the dispensing of a number of different size seeds and will not require the disc 49 to be changed except when seeds of extreme differences in sizes are to be planted. In addition, the ability of the user to change the size of the compartments in wheel 45 along with the other controllable factors set forth above permits the deposition of seed to be controlled completely both as *to* the number of seeds deposited and the spacing of the seed within the furrow.

Once the disc 49 is selected and the seed distributor is positioned on frame 11 with the planter attached to a draft vehicle, the hopper may then be filled with a quantity of seed which will feed by gravity through the boot 30 into the area formed by portion 73 of the cover 71 and the recess 53. The seed will continue to fill this area until the mouth of the boot is reached by the seed level.

As the planter is drawn over the field, the disc 49 will rotate in the direction indicated by the arrows in FIGURES 4, 5, and 7 and each of the opening 52 *and finger portions 57, 58* will successively [pass] *move in a path part of which passes* through the supply of seed at which time the gripping portion of fingers 55 will be opened to receive a seed. The opening of the fingers is accomplished by the leg 61 of fingers 55 contacting the front end 37' of the cam surface 37 to raise the legs 57 and 58 of the fingers with respect to the surface 38 of plate 34. When the gripping portion of the finger is in this raised position, a *wedge-shaped seed pocket or* V is formed by the finger 55 and the surface 38 which will *normally* receive a seed in the bight thereof as the fingers pass through the seed.

If the seed being planted is somewhat flat in nature such as corn, then the bevel 54 will aid to turn the seeds to assure that the seeds will be presented to the gripping portion of the finger while lying on one of their flat sides. Such positioning of the seeds in conjunction with the roughened under surface of the finger 55 permits the gripping portion to more firmly hold the seed during its travel to the discharge opening 39.

After the leg 61 of the finger 55 passes off end 37'' of cam 37, the second engaging means or finger securely holds the seed against the first engaging means or surface of plate 34 and holds the seed in continuous sliding contact initially against the first bearing surface 38 and subsequently against the second bearing surface 40a *for a sufficient time to permit excess seed not gripped by the finger portions 57, 58 to gravitate out of the seed pockets* during the rotation of the disc 49 around to the discharge opening 39. [The] *Should a plurality of seed be retained in the seed pocket, the* recessed portion 40 just preceding the discharge opening 39 assures that only a single seed from each finger will be delivered to the opening. Should two seeds *or more* be held by the gripping legs 57, 58 of the finger *against the surface 38,* the outermost seed located in the bight of V will be released as soon as it passes over the front edge of recess 40. This happens because the rearmost seed is still held between legs 57, 58 and surface 38 so that the gripping action of the finger 55 is released with respect to the front seed as soon as recess 40 is encountered and the seed will drop away by gravity before opening 39 is reached and return to seed supply through the annular recess 53.

When finger 55 carrying a seed therewith reaches opening 39, the seed is impelled by the spring action of the finger into the opening to pass into the interior of the housing.

Within the housing, the compartmented wheel is rotating in unison with disc 49 and one of the compartments of the wheel receives the seed as it is discharged into the opening 39. The seed is then carried by the wheel 45 to the opening 62 where it is deposited into one of the compartments of valve wheel 64; and as this wheel is rotated as previously described, the seed or seeds are dropped through the opening 69 in runner 68 into the furrow.

It will be seen that the number of seeds dropped into the furrow at each spacing can be controlled by rearranging dividers 47 to vary the size of the compartments of wheel 45. For instance, if the disc 49 contains eight of the openings 52 and dividers 47 are placed at positions corresponding to the first opening and the fifth opening, then four seeds would be delivered to each spacing along the ground. On the other hand, if four dividers were used with wheel 45 and placed at positions corresponding to the first, third, fifth and seventh openings, two seeds would be delivered to each spacing.

It will be readily understood that the present invention provides a planter which will assure the farmer that the field will be covered without any skipping occurring and be further assured that the correct number of seeds are being planted in the furrow.

Although a specific embodiment of the invention has been shown to illustrate the principles of the invention, it should be clear that many modifications can be effected that do not depart from these principles and therefore this invention should be limited only by the spirit and scope of the following claims.

I claim:

1. A seed planter comprising: a housing having a discharge opening in one of its faces, a cam associated with said face, a disc rotatably mounted on said face and provided with a plurality of openings, means for rotating said disc, movable means mounted in each of the openings in said disc and adapted to be actuated by said cam, a supply of seed through which said [openings] *movable means* pass during rotation of said disc, said cam during rotation of the disc causing said movable means to asme an open position when passing through said seed receive one of the same and then release said means securely hold the seed during rotation of the disc until id discharge opening is reached.

2. A seed planter comprising: a housing having a dis-arge opening in one of its faces, a cam associated with id face, a disc rotatably mounted on said face and ovided with a plurality of openings, means for rotating id disc, a movable finger mounted in each of said open-gs and adapted to be actuated by said cam, a supply of ed through which said openings will pass when said sc is rotated, said cam during rotation of said disc caus-g each of said fingers to move to an open position when assing through the seed to receive one of the same, then lease the finger to securely hold the seed during rota-on of the disc until said discharge opening is reached.

3. The invention as in claim 2 wherein the outermost lge of each of said openings in said disc is bevelled out-ardly from the outer face of the disc to the innerface aid in positioning said seed for engagement by said nger.

4. The invention as in claim 2 wherein said finger com-ises: a gripping portion and an inner portion the end f which is in contact with the inside face of said disc, e remaining part of said inner portion being angularly splaced out of the plane of the gripping portion to act a spring to bias said gripping portion into a seed ipping position.

5. A seed planter comprising: a hollow housing having one of its faces a discharge opening into the interior ereof, a compartmented wheel rotatably mounted in the terior of said housing, a cam associated with said face, disc rotatably mounted on said face and provided with plurality of openings, means for rotating said disc, a ovable finger mounted in each of said openings and lapted to be actuated by said cam, a supply of seed rough which said openings will pass when said disc rotated, said cam during rotation of said disc causing ch of said fingers to move to an open position when assing through said seed to receive one of the same, en release the finger to securely hold the seed during rther rotation of the disc until the discharge opening reached where the seed is discharged into one of the mpartments of said wheel.

6. The invention as claim 5 wherein, when the finger released, the seed is locked between said finger and face f said housing.

7. The invention as in claim 5 wherein said fingers hen in open position form a V shaped opening with said ce so that only the seed located in the bight of the V ill be held when said cam releases the finger.

8. The invention as in claim 5 wherein the size of the mpartments in said wheel are adjustable to control the umber of seeds each can receive.

9. A seed planter comprising: a hollow housing hav-g in one of its faces a discharge opening into the inte-or thereof, a compartmented wheel rotatably mounted the interior of said housing, said wheel provided with ovable dividers for changing the size of said compart-ents, a cam associated with said face, a disc rotatably ounted on said face and provided with a plurality of penings, means for rotating said disc and said wheel in nison, a movable finger mounted in each of said open-gs and adapted to be actuated by said cam, a supply f seed through which said openings will pass when said isc is rotated, said cam during rotation of said disc caus-g each of said fingers to move to an open position when assing through said seed to receive one of the same, en release the finger to securely hold the seed during rther rotation of the disc until the discharge opening reached where the seed is discharged into one of the ompartments of said wheel and a second compartmented heel rotatably mounted between the walls of said hous-ng at the bottom thereof, the compartments of which cooperate with the compartments of said first wheel to control the number of seeds delivered to the ground.

10. A seed planter comprising: a hollow housing having in one of its faces a discharge opening into the interior thereof, a cam associated with said face, a disc rotatably mounted on said face and provided with a plurality of openings, means for rotating said disc, a recess in said face, one end of which is connected into one end of said discharge opening, a movable finger mounted in each of said openings in said disc, and adapted to be actuated by said cam, a supply of seed through which said openings pass when said disc is rotated, said cam during rotation of said disc causing each of said fingers to move to an open position when passing through the seed to receive one of the same, then release said finger to securely hold the seed during rotation of the disc, said seed being held in a V-shaped opening formed by the finger and said face, said recess acting to assure that only a single seed reaches said dicharge opening by causing any extra seeds held by said finger other than the one located in the bight of said V-shaped opening to be released before said finger reaches the discharge opening.

11. The invention as in claim 10 wherein a compartmented wheel is rotatably mounted in the interior of said housing and which is rotated by the same means as the disc and wherein said seeds are discharged into one of said compartments to be delivered to the ground.

12. A seed planter comprising: a hollow housing having in one of its faces a discharge opening into the interior thereof, said opening positioned at a point substantially above the bottom of said housing when the housing is arranged in a vertical position, a compartmented wheel mounted for rotation within the interior of said housing, a second discharge opening in said housing from its interior to its exterior and located at the bottom thereof, a second compartmented wheel rotatably mounted in said second opening, a cam associated with said face, a disc rotatably mounted on said face and provided with a plurality of openings, means for rotating said disc and said first compartmented wheel in unison, said second wheel driven by said first wheel, a movable finger mounted in each of said openings and adapted to be actuated by said cam, a supply of seed through which said openings will pass when said disc is rotated, said cam during rotation of said disc causing each of said fingers to move to an open position when passing through said seed to receive one of the same, then release the finger to securely hold the seed during further rotation of the disc until the discharge opening is reached where the seed will be discharged into one of the compartments of said first wheel, the compartments of said second wheel cooperating with those of said first wheel to control the number of seeds delivered to the ground.

13. A seed planter comprising: a hollow housing having on one of its faces a discharge opening into the interior thereof, said face having a flat outer portion and an inner recessed portion, a cam associated with said face and located in said recessed portion, a disc rotatably mounted on said face and provided with a plurality of openings, means for rotating said disc, said disc having on its inner side a flat outer portion to cooperate with said flat outer portion of said face and an inner recessed portion cooperating with said first mentioned recessed portion of said face, a movable finger mounted in each of said openings of said disc and adapted to be actuated by said cam, a cover for said disc which forms therewith a chamber to hold a supply of seed through which said openings pass when said disc is rotated, said cam during rotation of said disc causing said fingers to move to an open position when passing through said seed to receive one of the same, then release said fingers to securely hold the seed during rotation of the disc until the discharge opening is reached.

14. The invention as in claim 13 wherein a compartmented wheel is rotatably mounted in the interior of said housing and which is rotated by the same means as said disc and wherein said seeds are dischaged into one of said compartments to be delivered to the ground.

15. The invention as in claim 13 wherein said flat outer portion of said face is recessed in the area immediately adjacent the leading edge of said discharge opening to provide a means for assuring that each of said fingers delivers only a single seed to the discharge opening.

16. A seed planter comprising: a hollow housing having in one of its faces a discharge opening into the interior thereof positioned at a point substantially above the bottom of said housing when the housing is arranged in a vertical position, a hopper mounted above said housing and containing a quantity of seed, said face having a flat outer portion and an inner recessed portion, a cam associated with said face and located in said recessed portion, a disc rotatably mounted on said face and provided with a plurality of openings, means for rotating said disc, said disc having on its inner side a flat outer portion to cooperate with said flat outer portion of said face and an inner recessed portion cooperating with said first mentioned recessed portion of said face, a movable finger mounted in each of said openings of said disc and adapted to be actuated by said cam, a cover for said disc which forms therewith a chamber to hold a supply of seed through which said openings pass when said disc is rotated, a seed boot connecting said hopper to said cover at the lower portion thereof to provide a means for seed to be fed by gravity from said hopper to said chamber, a first wheel with adjustable compartments mounted in the interior of said housing and adapted to be rotated in unison with said disc, a second discharge opening at the bottom of said housing when arranged in vertical position and a second compartmented wheel rotatably mounted in said last mentioned opening, said second wheel being driven by said first wheel, said fingers being actuated to an open position by said cam as they pass through the seed in said chamber to receive one of the same, said fingers when released by the cam securely holding the seed during rotation of the disc until the first mentioned discharge opening is reached where said seed is deposited in one of the compartments of said first mentioned wheel, the second compartmented wheel cooperating with said first wheel to control the number of seeds delivered to the ground.

17. The invention as in claim 16 wherein the dividers defining the compartments of the first wheel cooperate with the dividers defining the compartments of the second wheel to cause rotation of said second wheel.

18. [A seed planter comprising:] *In a seed planter the combination of* a housing having a discharge opening in one of its faces, a cam associated with said face, rotatable means mounted on said face, means for rotating said rotatable means, movable means mounted on said rotatable means and adapted to be actuated by said cam, a supply of seed through which said movable means pass during rotation of said rotatable means, said cam during rotation of the [disc] *rotatable means* causing said movable means to assume an open position when passing through said seed to receive one of the same and then release said means to securely hold the seed during rotation of the rotatable means until said discharge opening is reached.

19. The [seed planter] *combination* set forth in claim 18 wherein a compartmented wheel is rotatably mounted in the interior of said housing and which is rotated by the same means as the rotatable means and wherein said seeds are discharged into one of said compartments to be delivered to the ground.

20. A seed planter comprising: *structure for housing* a supply of seeds (S), conveying means (45, 62, 63, 67) to convey selected seeds to a seedbed, and seed selecting means including a surface (38) disposed between the supply of seeds and the conveying means, said surface having a portion in contact with said supply of seeds and another portion provided with a discharge opening (39) that is in communication with said conveying means, and seed engaging means (55) normally biased toward said surface and operable to engage seed within said supply of seeds, to hold said seed in continuous sliding contact against the surface, and to forcibly eject the engaged seed through said discharge opening.

21. The seed planter set forth in claim 20 in which the surface is provided with a relatively small step (40b), the engaged seed being slid over said step by said engaging means whereby extra seeds held between said engaging means and the surface are caused to be released before said engaging means reaches the discharge opening.

22. The seed planter set forth in claim 20 in which said conveying means convey seeds to said seedbed at a rate responsive to movement of said seed engaging means.

23. A seed planter comprising: *structure for housing* a supply of seeds (S), conveying means (45, 62, 63, 67) to convey selected seeds to a seedbed, and seed selecting means including a surface (38) having a first portion in contact with said supply of seeds and a second portion remote from the supply of seeds, said second portion being provided with a discharge opening (39) in communication with said conveying means and through which individual seeds may be selectively discharged, rotary means (49) operatively associated with said surface, a plurality of engaging means (55) carried by said rotary means and normally resiliently biased toward said surface, means (70, 69, 42, 41) to rotate said rotary means, and means (37) to hold said engaging means away from the first portion of the surface whereby seed can be introduced between said first portion and said engaging means, said engaging means engaging seed as they pass through said supply of seed, holding the engaged seed in continuous sliding contact with said surface, and forcibly ejecting said engaged seed through said discharge opening.

24. The invention set forth in claim 23 in which step means are provided on said surface to insure that only a single seed be discharged by each engaging means, the engaged seed being slid over said step means by said engaging means, the parts being so arranged and constructed that if more than one seed is initially held in contact with said surface by said engaging means that as the step is encountered the outermost seed will be released while the rearmost seed will be held in contact with said surface.

25. The seed planter set forth in claim 23 in which a compartmented wheel (45) is rotatably mounted adjacent said discharge opening and which is rotated by the same means as the rotating means and wherein said seeds are discharged into one of said compartments.

*26. For use in a seed planter a seed selecting mechanism comprising the combination of a relatively stationary plate member, means mounted for rotation adjacent and parallel to said plate member including seed-engaging means biased toward said plate member and movable through a supply of seed, and actuating means associated with said plate member and operative to move said engaging means against bias when said engaging means passes through said supply of seed, said engaging means being biased toward said plate member after rotation beyond said actuating means to hold seed between said seed engaging means and said plate member.*

*27. The combination set forth in claim 26 wherein said plate member is provided with a discharge opening remote from said actuating means and underlying the path of rotation of said engaging means whereby any seed held between said plate member and said engaging means is ejected through said opening.*

*28. The combination set forth in claim 27 in which conveying means are mounted for rotation within the planter to convey the seed from the discharge opening to a furrow, said conveyor means being provided with means operable to accumulate seed in clusters.*

*29. The combination set forth in claim 27 wherein said plate member is provided with means to insure that*

*only a single seed is discharged through said discharge opening by each engaging means.*

*30. For use in a seed planter a seed selecting mechanism comprising the combination of means providing a supply of seeds, means including a relatively stationary surface having a first portion in contact with the supply of seed and a second portion remote from the supply of seed, rotary means operatively associated with said surface and including movable seed-engaging means biased toward said surface, actuating means associated with said surface and operative to hold said engaging means away from said first portion of said surface whereby seed can be introduced between said engaging means and said surface.*

*31. The combination as set forth in claim 30 wherein an opening is provided in said second portion of said surface and underlying the path of movement of said engaging means whereby said engaging means will discharge any seed held between said surface and said engaging means through said opening.*

*32. The combination set forth in claim 31 in which said seed planter further includes conveyor means positioned to receive seeds discharged through said opening, said conveyor means being compartmented with the compartments being successively advanced into communication with said opening at a uniform rate whereby each compartment receives the same number of seeds.*

*33. The combination set forth in claim 31 in which said surface is provided with means operable to insure that only a single seed be discharged by each engaging means.*

*34. In a planter a seed selecting device comprising an upright housing having a seed inlet for effecting an accumulation of seeds in the housing and including a fixed wall having a seed outlet; a rotary device in the housing with radial structure thereon, the radial structure having elements forming seed pockets with said wall, with each of the elements diverging from the wall, each of said pockets being adapted to receive a plurality of seeds therein and to grip a single seed; means for rotating said device whereby each of the pockets of said radial structure moves in a path, part in which the pocket passes through the accumulation of seed in the housing to permit the pocket to receive seeds therein, part in which the pocket passes adjacent the outlet, and an inetrmediate part in which the pocket moves between the accumulation of seed and the outlet, the time of movement required in said intermediate part affording a time delay between receipt of seeds in the respective pocket and the part of the path adjacent the outlet to permit excess seed over the retained single seed in the respective pocket to gravitate from the pocket.*

*35. The structure as set forth in claim 34 in which the elements forming the pockets are fingers spaced angularly around the device with a portion of each finger being adjacent the wall and diverging outwardly from the surface of the wall to thereby form the pockets with the surface of the wall into V-shaped open-sided pockets.*

*36. The structure as set forth in claim 35 in which the fingers are resiliently biased toward the wall.*

*37. The structure as set forth in claim 36 in which the fingers will carry in the respective pockets seeds that slide against the wall, the wall is part of said housing and the outlet is in the wall and along the path of movement of the fingers whereby the fingers will impel the seeds held in the pockets through the outlet.*

*38. The structure as set forth in claim 35 in which the fingers are utilized to hold seed in sliding contact with the wall during the aforesaid intermediate part of said path and the wall has surface irregularities to assist in release of the excess seeds.*

*39. In a planter a seed selecting device comprising an upright housing having a seed inlet for effecting an accumulation of seeds in the lower portion of the housing and a seed outlet; a rotary device in the housing with radial structure thereon, the radial structure having means forming open-sided V-shaped seed pockets with each of the pockets having divergent sides extending from a bight end and adapted to receive a plurality of seeds therein and to grip a single seed in the bight; means for rotating said device whereby each of the pockets of said radial structure moves in a path, part in which the pocket passes through the accumulation of seed in the housing to permit the pocket to receive seeds therein, part in which the pocket passes adjacent the outlet, and an intermediate part in which the pocket moves vertically from the accumulation of seed toward the outlet, the time of movement required in said intermediate part affording a time delay between receipt of seeds in the respective pocket and the part of the path adjacent the outlet to permit excess seed over the retained single seed in the respective pocket to gravitate from the pocket.*

*40. The structure as set forth in claim 39 in which the rotary device is horizontal, the path is a circular path and the outlet is above the accumulation of seed whereby the pockets pass adjacent the outlet just prior to their being passed through the accumulation of seed.*

*41. In a planter a seed selecting device comprising an upright housing structure having a seed inlet for providing an accumulation of seeds in the housing and a seed outlet above the accumulation and in a fixed upright wall of the housing structure; a horizontal rotary device in the housing with radial structure thereon, the radial structure having means thereon forming tapered open-sided seed pockets with the wall adapted to receive a plurality of seeds and to retain a single seed in the respective pockets; means for rotating said device relative to the wall whereby the seeds in the pockets of said radial structure slide against and in a path along the wall, part in which the pockets pass through the accumulation of seed to permit the pockets to receive seeds therein, part in which the pockets pass adjacent the outlet for discharge of single seeds from the respective pockets through the outlet, and an intermediate part in which the pockets move between the accumulation of seed and the outlet, the intermediate part affording time between receipt of seeds in the respective pockets and the passing of the pockets adjacent the outlet to permit excess seeds over the retained single seeds in the respective pockets to gravitate from the pockets.*

*42. In a planter a seed selecting device comprising an upright housing structure having a seed inlet for providing an accumulation of seeds in the housing and a seed outlet above the accumulation and in an upright wall of the housing structure; a horizontal rotary device in the housing with radial structure thereon, the radial structure having means thereon forming tapered open-sided seed pockets with the wall adapted to receive a plurality of seeds and to retain a single seed in the respective pockets; means for rotating said device relative to the wall whereby the seeds in the pockets of said radial structure move in a path along and in sliding contact with the wall, part in which the pockets pass through the accumulation of seed to permit the pockets to receive seeds therein, part in which the pockets pass adjacent the outlet for discharge of single seeds from the respective pockets through the outlet, and an intermediate part in which the pockets move between the accumulation of seed and the outlet, the intermediate part affording time between receipt of seeds in the respective pockets, and the passing of the pockets adjacent the outlet to permit excess seeds over the retained single seeds in the respective pockets to gravitate from the pockets, the wall having an irregular surface along which the pockets pass during the intermediate part for the purpose of releasing said excess seeds.*

*43. In a planter a seed selecting device comprising an upright housing structure having a seed inlet for providing an accumulation of seeds in the housing and a seed outlet above the accumulation and in an upright wall of the housing structure; a horizontal rotary device*

*in the housing with radial structure thereon, the radial structure having fingers biased toward and forming tapered open-sided seed pockets with the wall, the pockets being adapted to receive a plurality of seeds and to retain a single seed; means for rotating said device relative to the wall whereby the seeds in the pockets of said radial structure move in a path along and in sliding contact with the wall, part in which the pockets pass through the accumulation of seed to permit the pockets to receive seeds therein, part in which the pockets pass adjacent the outlet for discharge of single seeds from the respective pockets through the outlet, and an intermediate part in which the pockets move between the accumulation of seed and the outlet, the intermediate part affording time between receipt of seeds in the respective pockets and the passing of the pockets adjacent the outlet to permit excess seeds over the retained single seeds in the respective pockets to gravitate from the pockets, the wall having an irregular surface along which the pockets pass during the intermediate part for the purpose of releasing said excess seeds.*

*44. In a seed planter a selecting device comprising an upright housing having divider means therein for dividing the housing into left- and right-hand compartments, a seed inlet for providing an accumulation of seeds in the base portion of the left-hand compartment; a seed discharge means in the right-hand compartment, and a seed opening above the accumulation of seeds between said compartments through which seeds may pass from the left- to the right-hand compartment; a horizontal rotary device in the left-hand compartment with radial structure thereon, the radial structures including means forming seed receiving pockets, with each pocket being adapted to receive a plurality of seeds and to retain a single seed; means for rotating said device whereby the pockets move in a path, part of which passes through the accumulation of seed to permit the pockets to receive seeds therein, part of which moves the pockets adjacent the opening to accommodate discharge of single seed from the respective pockets through the opening and an intermediate part of which moves the pockets between the accumulation of seed and the opening, the intermediate part affording sufficient time between receipt of seeds in the respective pockets and discharge of single seed from the respective pockets through the opening to permit excess seeds over the retained single seeds in the respective pockets to gravitate from the pockets; a device in the right-hand compartment having compartments, and means driving the latter device for moving each of the compartments from a seed receiving relation with the opening between the compartments to a seed discharge relation with the discharge means of the right-hand compartment.*

*45. For use in a seed planter a seed pickup mechanism comprising the combination of a structure having a surface extending radially from an axis, a rotary device supported adjacent the structure and on said axis having radial structure thereon positioned to move alongside the surface; seed pocket means formed partially by finger elements on the radial structure and partially by said surface, with the finger elements diverging from the surface to form the pockets into wedge-shaped openings, the pockets being adapted to receive pluralities of seeds and to grip single seeds in the bights of the respective wedge-shaped openings; and means rotating the rotary device to move the fingers relative to the surface from an area in which seeds may be deposited in the pockets to an area of seed discharge from the pockets.*

*46. The structure as set forth in claim 45 in which the surface has a surface irregularity over which seeds gripped in the bight of the wedge may pass so that seeds in excess of one in the pocket may be released from the pocket.*

*47. The structure as set forth in claim 46 in which the fingers are biased toward the surface to afford the gripping action on the seeds between the fingers and surface.*

*48. The structure as set forth in claim 47 in which the area of discharge is an opening in the surface of the radial structure along the path of movement of the fingers whereby the fingers will force seed gripped in the respective bights through the opening.*

*49. For use in a seed planter a seed selecting mechanism comprising the combination of a plate having a surface with a surface outlet opening therein; a rotary device supported alongside the plate and having radial structure thereon positioned to move alongside the surface; wedge-shaped seed pockets spaced angularly around the rotary device formed partially by finger elements on the radial structure and partially by said surface whereby seeds in the pockets slide against the surface as the rotary device is rotated; means rotating the rotary device to move the fingers relative to the surface between an area in which seeds are deposited in the pockets and the surface outlet where the seeds are discharged; and a radial compartmented wheel on the opposite side of the plate from the rotary device rotatable to move the compartments of the wheel adjacent to and in seed receiving relation to the outlet to a planter discharge means.*

*50. For use in a seed planter a seed mechanism comprising the combination of an upright plate having a surface with a surface outlet opening therein; a horizontal rotary device supported adjacent the plate and having radial structure thereon positioned to move alongside the surface; seed pockets spaced angularly around the rotary device formed partially by finger elements on the radial structure and partially by said surface with said finger elements being biased toward the surface whereby seeds in the pockets are gripped between the fingers and surface and slide against the surface as the rotary device is rotated; means rotating the rotary device to move the fingers along the surface between an area in which seeds are deposited in the pockets and the surface outlet where the seeds are discharged; and a compartmented device supported on the opposite side of the plate from the rotary device rotatable to move the compartments adjacent to and in seed receiving relation to the outlet to a planter discharge means.*

*51. A seed selecting mechanism for use in a planter having a frame and a seed hopper mounted on the frame, said seed selecting mechanism comprising: a relatively stationary plate mounted on the frame in communication with the hopper and in contact with the seed, a seed wheel mounted on the frame for rotation parallel to said plate in the path of said seed, including radially projecting fingers, axially projecting actuating means carried by the plate engageable with said fingers during a portion of the path of rotation of the wheel to deflect at least portions of said fingers sufficiently to accommodate a seed between the respective deflected finger portions and the plate, each of said finger portions being biased toward the plate after rotation of the wheel beyond said actuating means to hold said seed between the respective finger portion and the plate.*

*52. The invention set forth in claim 51, wherein the trailing edge of each of said finger portions is closely adjacent the plate and is adapted to prevent dislodgment of seed therefrom prior to discharge of seed through said outlet.*

*53. The invention set forth in claim 51, wherein said wheel is in engagement with the adjacent face of said plate.*

*54. The invention set forth in claim 51, wherein said finger portions are relatively elongated sufficiently to receive a plurality of radially spaced seeds between the respective finger portions and said plate.*

*55. The invention set forth in claim 51, wherein said actuating means is an arcuately shaped cam concentric with the axis of said wheel and engageable with said fingers.*

*56. The invention set forth in claim 55, wherein an opening is provided in the lower portion of the hopper wall to allow seed to flow outwardly therefrom, and said wheel is mounted in a vertical housing communicating with and receiving seed from said opening, said wheel being rotatable on a horizontal axis with its lower portion disposed in the seed.*

*57. A seed selecting mechanism for use in a planter having a frame and a seed hopper mounted on the frame, said seed selecting mechanism comprising: a relatively stationary plate mounted on the frame in communication with the hopper and in contact with the seed, a seed wheel mounted on the frame for rotation parallel to said plate in the path of said seed, including radially projecting fingers, axially projecting actuating means carried by the plate engageable with said fingers during a portion of the path of rotation of the wheel to deflect at least portions of said fingers sufficiently to accommodate a seed between the respective deflected finger portions and the plate, each of said finger portions being biased toward the plate after rotation of the wheel beyond said actuating means to hold said seed between the finger portion and the plate, and a discharge outlet formed in said plate registrable with successive of said finger portions during rotation of the wheel for the discharge of seed held thereby.*

*58. A seed selecting mechanism for use in a planter having a frame and a seed hopper mounted on the frame, said seed selecting mechanism comprising: a relatively stationary plate mounted on the frame in communication with the hopper and in the path of seed flowing therefrom, a seed wheel rotatably mounted on the frame parallel to said plate and having relatively long radial fingers at least portions of which are axially deflectable and have a bias toward said plate, cam means carried by said plate concentric with said wheel and projecting axially from the plate for a portion of its circumference, said cam being engageable with said fingers during rotation of the wheel to deflect the finger portions and accomodate passage of seed between the plate and said finger portions, said portions of the fingers being biased toward the plate and adapted to hold a seed between each finger portion and the plate upon movement of the finger out of engagement with the cam, and an outlet in said plate registrable with successive of said finger portions during rotation of the wheel for the discharge of seed from the finger portions.*

*59. In a seed planter having a compartment with a lower portion for holding a body of seeds and an upper portion having an outlet to a seed discharge passage for the dispatch of said seeds, means for sequentially gathering seeds from said seed body and delivering them into the discharge passage, comprising: a seed-holding structure having an annular surface disposed about a horizontal axis passing through said upper compartment portion and facing axially of said axis, a seed wheel in said compartment rotatable about said axis, seed engaging jaws on the wheel in spaced apart relation circumferentially about said axis and spaced radially thereof a distance to sequentially dip into said seed body and subsequently pass in proximity with the discharge passage inlet attendant to each revolution of the wheel, means operable in timed relation with rotation of said wheel to spread said jaws from said surface while said jaws are dipped in the seed body to admit a seed between such dipped jaws and said surface and then move the jaws toward said surface to grip therewith such admitted seeds, means operable to release the grip on said seeds as the jaws arrive in contiquity with the outlet to the discharge passage and effect entry of the released seeds through said outlet into the seed discharge passage.*

References Cited

The following references, cited by the Examiner, are of record in the patented file of this patent or the original patent.

UNITED STATES PATENTS

| | | | |
|---|---|---|---|
| 886,253 | 4/1908 | Roseland | 221—217 |
| 1,566,187 | 12/1925 | Fifer | 222—370 X |
| 2,613,850 | 10/1952 | Varco | 221—217 |
| 3,348,504 | 10/1967 | Fischer | 111—34 |
| 3,522,601 | 1/1971 | Hansen et al. | 221—219 |
| 3,618,820 | 11/1971 | Keeton | 221—219 |
| 3,626,877 | 12/1971 | Hansen et al. | 111—85 |
| 3,627,050 | 12/1971 | Hansen | 111—77 |
| 3,670,671 | 6/1972 | Lienemann et al. | 111—77 |

ROBERT E. BAGWILL, Primary Examiner

U.S. Cl. X.R.

111—77.

FIP8309 OR RE 27,579

250/2

INVENTOR.
ARTHUR H. YOUMANS
BY E. H. Bard
ATTORNEY